INVENTOR
Joseph Zemanek, Jr.
Arthur F. Zobal
ATTORNEY

Jan. 5, 1971  J. ZEMANEK, JR  3,553,640
SYSTEM FOR OBTAINING UNIFORM PRESENTATION OF
ACOUSTIC WELL LOGGING DATA
Original Filed May 28, 1968  5 Sheets-Sheet 3

INVENTOR
Joseph Zemanek, Jr.

Arthur F. Zobal
ATTORNEY

Jan. 5, 1971 J. ZEMANEK, JR 3,553,640
SYSTEM FOR OBTAINING UNIFORM PRESENTATION OF
ACOUSTIC WELL LOGGING DATA
Original Filed May 28, 1968 5 Sheets-Sheet 4

INVENTOR
Joseph Zemanek, Jr.
ATTORNEY

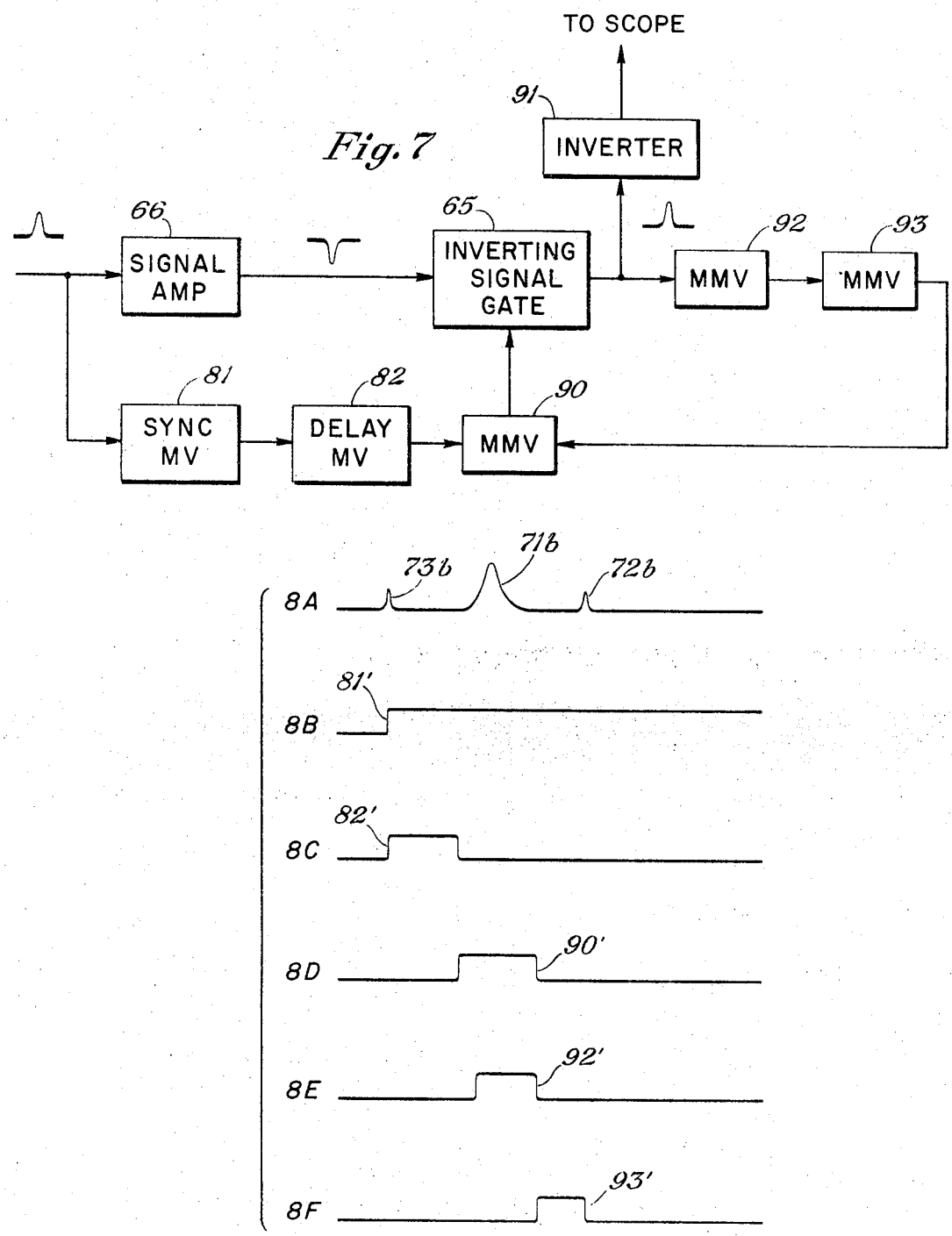

United States Patent Office 3,553,640
Patented Jan. 5, 1971

3,553,640
SYSTEM FOR OBTAINING UNIFORM PRESENTATION OF ACOUSTIC WELL LOGGING DATA
Joseph Zemanek, Jr., Dallas, Tex., assignor to Mobil Oil Corporation, a corporation of New York
Continuation of application Ser. No. 732,598, May 28, 1968. This application Sept. 11, 1969, Ser. No. 871,465
Int. Cl. G01v 1/40
U.S. Cl. 340—15.5         17 Claims

ABSTRACT OF THE DISCLOSURE

The specification discloses a directional acoustic transducer supported for rotation in a borehole and operated periodically to transmit acoustic pulses to the borehole wall and to detect reflected acoustic energy. Circuitry is employed to produce output signals of the same amplitude and width in response to the reflected acoustic energy detected. Only one output signal is produced during each period of operation of the transducer and which is representative of the primary reflection of acoustic energy from the borehole wall. The output signals produced are applied to an oscilloscope to modulate the intensity of its electron beam which is swept across the screen of the scope once for each rotation of the transducer.

---

This application is a continuation of application Ser. No. 732,598, filed May 28, 1968, now abandoned.

BACKGROUND OF THE INVENTION

This invention relates to a system for uniformly presenting data obtained with an acoustic well logging system which scans the wall of the borehole.

In U.S. Pat. No. 3,369,626 there is disclosed an acoustic borehole logging technique and system wherein the walls of the borehole are scanned periodically with acoustic energy for obtaining information of interest. In one embodiment, a single transducer which acts both as a transmitter and receiver is rotated in the borehole and periodically actuated to produce acoustic pulses which are applied to the borehole wall. Reflected energy is detected by the transducer between acoustic pulses and converted into signals which are employed to intensity modulate the electron beam of an oscilloscope which is swept across the screen of the oscilloscope once for each rotation of the transducer. Successive traces are produced representative of the borehole wall characteristics as sensed by the rotating transducer. Each successive trace is photographed by suitable means for the production of a two-dimensional flat record of the inside surface of the borehole wall.

The system of said aforementioned patent is very sensitive to fractures and irregularities of the borehole wall. The signals produced for intensity modulating the electron beam generally have amplitudes dependent upon the energy of reflected acoustic pulses. Such a system results in the production of a picture having tones of white, gray, and black.

In certain logging operations, however, it has been found more desirable to have a picture of uniform intensity and with tones of only white and black. For example, this situation exists in logging cased boreholes for apertures formed from perforating operations or from corrosion. In cased holes, there is a wide variation in detected signal amplitude and which variation is greater than in uncased holes. The wide variation is due to the fact that the casing is a good reflector of acoustic energy over smooth, undistorted areas and hence will produce very strong, reflected signals over these areas. Corrosion pits not extending through the casing or casing deformation, however, will produce weaker signals since these conditions cause more acoustic energy to be reflected away from the transducer and hence less to be reflected directly back to the transducer. The resulting signals of different amplitudes and inherently different widths, if allowed to intensity modulate the scope, will result in the production of tones of gray which tend to mask the appearance of apertures adjacent areas of casing deformation or corrosion. In addition, the reverberation of acoustic energy between the transducer and the borehole wall results in the production of strong signals subsequent to the primary reflection. By primary reflection is meant energy reflected only once from the interior wall of the borehole. These reverberation signals, if recorded, also tend to mask the apertures or information of interest.

SUMMARY OF THE INVENTION

In accordance with one aspect of the present invention, there is provided a novel system for enhancing the presentation of data obtained in an acoustic logging system having an acoustic transmitting and receiving means which is periodically operated to generate acoustic pulses in a borehole and to detect reflected acoustic energy. The system comprises an arrangement for producing, in response to the reflected energy detected, output signals which have the same width as well as the same amplitude. In a system wherein the beam of an oscilloscope is intensity modulated, this arrangement will result in the production of a picture of uniform intensity having only tones of black and white. Apertures can be clearly presented by allowing these uniform signals of the same width and amplitude and representative both of large amplitude as well as lower amplitude received signals to turn the electron beam ON. Apertures, resulting in the lack of reflected signals, thus will be shown on the record obtained clearly as uniformly dark areas against a uniformly white background.

Noise resulting from reverberations following the detection of the primary reflection within each period of operation is eliminated to present a record or picture of enhanced qualities. In this respect, a feedback arrangement is provided which allows only one signal to be applied to the recording device during each period of operation between acoustic pulses and which signal is representative only of the primary reflection detected during each period. Variations of the feedback arrangement for eliminating reverberation signals are applicable to either open hole or cased hole logging.

In accordance with a detailed aspect of one embodiment of the present invention, there is provided a signal-producing means for producing signals representative of reflected acoustic pulses detected. Gating signal-generating means generates a gating signal during each period of operation beginning at a time when the signal representative of the primary reflection is expected to occur. Gate means coupled to the signal-producing means and to the gating signal-generating means passes signals from the signal-producing means to control circuitry during the time when the signal representative of the primary reflection is expected to occur. In response to the first signal passed to the control circuitry, an output is produced by the control circuitry which triggers a signal-shaping means for the production of an output signal during each period of operation. Each output signal produced has the same width and amplitude. It begins, during each period, at a time substantially coinciding with the beginning of the first signal and hence the primary reflection signal passed to the control circuitry. Feedback means responsive to the output of the gating signal-generating means generates a control signal beginning at a time coinciding with the beginning of the gating signal. The output signal from the signal-shaping means is applied to the display device employed and to the feedback means for terminating the production of the control signal at a time shortly after the beginning of an output signal during each period. Termination of the control signal places the control circuitry in a condition whereby its output also is terminated. The control circuitry remains in this condition for the remainder of the period and thus allows only one output signal to be produced during each period of operation and which is representative of the primary reflection detected.

BRIEF DESCRIPTION OF THE DRAWINGS

FIG. 7 illustrates an arrangement suitable for open hole logging for eliminating reverberation signals;

FIGS. 8A–8F illustrate traces useful in understanding the system of FIG. 7; and

DESCRIPTION OF SPECIFIC EMBODIMENTS

Figure 1:
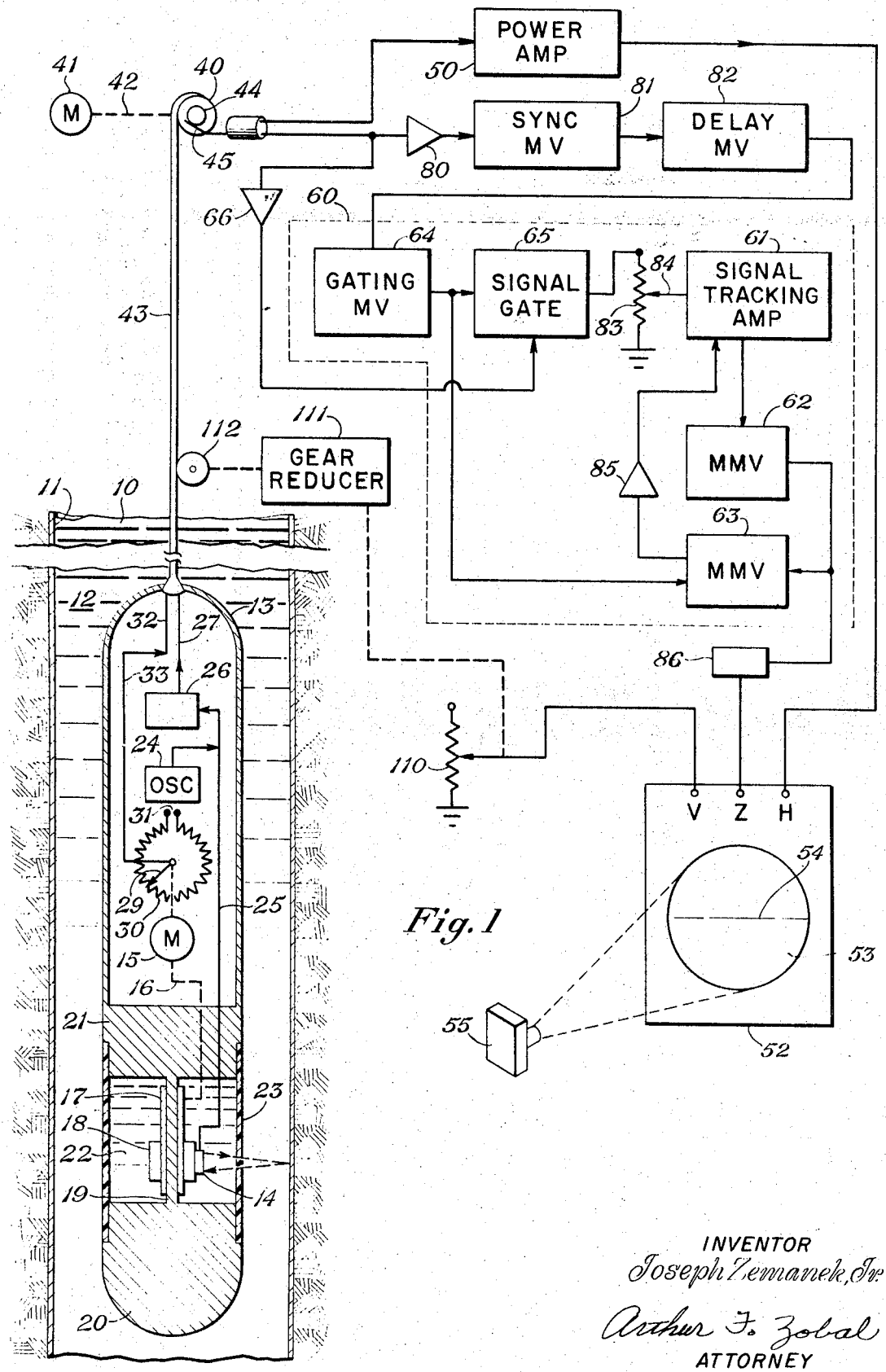
FIG. 1 illustrates the present invention employed in combination with an acoustic well logging tool.

Referring now to FIG. 1, there will be described briefly the borehole system employed for carrying out logging operations in a borehole illustrated at 10. This borehole is lined with metal casing 11 and contains borehole fluid 12. The borehole system comprises a borehole tool 13 having an acoustic transducer 14 which acts as a transmitter and receiver of acoustic energy. During logging operations, the transducer 14 is rotated through 360° at a rate of about 180 revolutions per minute by motor 15, mechanical drive 16, sleeve 17, and transducer mount 18. The sleeve 17 rotates about rod 19 which connects end member 20 to structure 21. During each 360° cycle, the transducer 14 is pulsed periodically at a rate of about 2,000 pulses per second for the application of acoustic pulses to the borehole wall by way of tool fliud 22, rubber boot 23, and the borehole fluid 12. Oscillator 24, which is coupled to the transducer 14 by way of conductor 25 and slip rings (not shown), periodically actuates the transducer for the production of acoustic pulses. Between transmitted acoustic pulses, reflected energy is detected by the transducer 14 and applied to the surface by way of conductor 25, gating and amplifying circuitry 26, and cable conductor 27. Sync pulses are obtained from the transducer 14, when it is actuated, and also are applied to conductor 27.

Also rotated by motor 15 is the arm 29 of a potentiometer 30 which has a voltage applied across its terminals 31 from a source not shown. The voltage obtained at the arm 29, as it rotates, is a sawtooth wave whose period is equal to the period of revolution of the transducer 14. This voltage is applied to cable conductor 32 by way of conductor 33 for transmission to the surface.

During logging operations, drum 40 driven by motor 41 winds and unwinds the supporting connection 42 cable 43 to move the tool 13 continuously through the borehole. At the surface, the various pulses and signals are taken from cable conductors by way of slip rings and brushes illustrated, respectively, at 44 and 45.

The sawtooth wave voltages are applied by power amplifier 50 to the horizontal deflection plate of oscilloscope 52. The sawtooth wave voltages thus sweep the scope's electron beam when it is ON. The output signals of the transducer 14, representative of acoustic energy reflected from the wall of the borehole, are applied to the Z axis input or to the cathode of the cathode-ray tube of the oscilloscope to intensity modulate the electron beam and turn it ON at a high repetition rate as it sweeps across the screen 53. Thus, during each rotational cycle of the transducer 14 there is produced across the dark screen 53 of the oscilloscope 52 an illuminating trace illustrated at 54. Gaps in the trace are due to the lack of a received signal or the detection of weak signals. Successive traces are stepped vertically and photographed by a camera 55 for the production of a two-dimensional print or display of successive traces and which display represents a folded-out section of the inside of the borehole wall.

In accordance with one aspect of the present invention, the signals applied to the Z axis or to the cathode of the scope 52 have the same width and the same amplitude whereby the picture obtained will have a uniform intensity and tones of only black and white. This can be understood since the intensity of the trace produced on the screen of the scope is dependent on the amplitude and width of the signals applied to modulate the electron beam. If the signals applied to control the electron beam had different amplitudes, the electron beam would be modulated to various levels of intensity, and hence tones of gray would result. Moreover, if the signals applied to control the beam had different widths, the electron beam would be turned ON for different time durations, also resulting in tones of gray. These tones of gray tend to mask the appearance of apertures in casing adjacent areas of irregular surfaces of deformation.

The system disclosed allows high amplitude as well as low amplitude received signals to produce the uniform signals of equal width and amplitude. Thus both, the high and low amplitude signals, in effect, are allowed to turn the electron beam ON whereby apertures may be clearly located and distinguished even if adjacent areas of casing corrosion or deformation.

In addition to the above, only one signal is applied to the Z axis of the scope 52 for each pulsing operation of the transducer 14. This signal is representative of the primary reflection from the wall of the casing 11 whereby later occurring reverberations, due to the reflection of energy between the transducer 14 and the casing wall, are prevented from interfering or masking the appearance of apertures on the pictures obtained.

Figure 2:
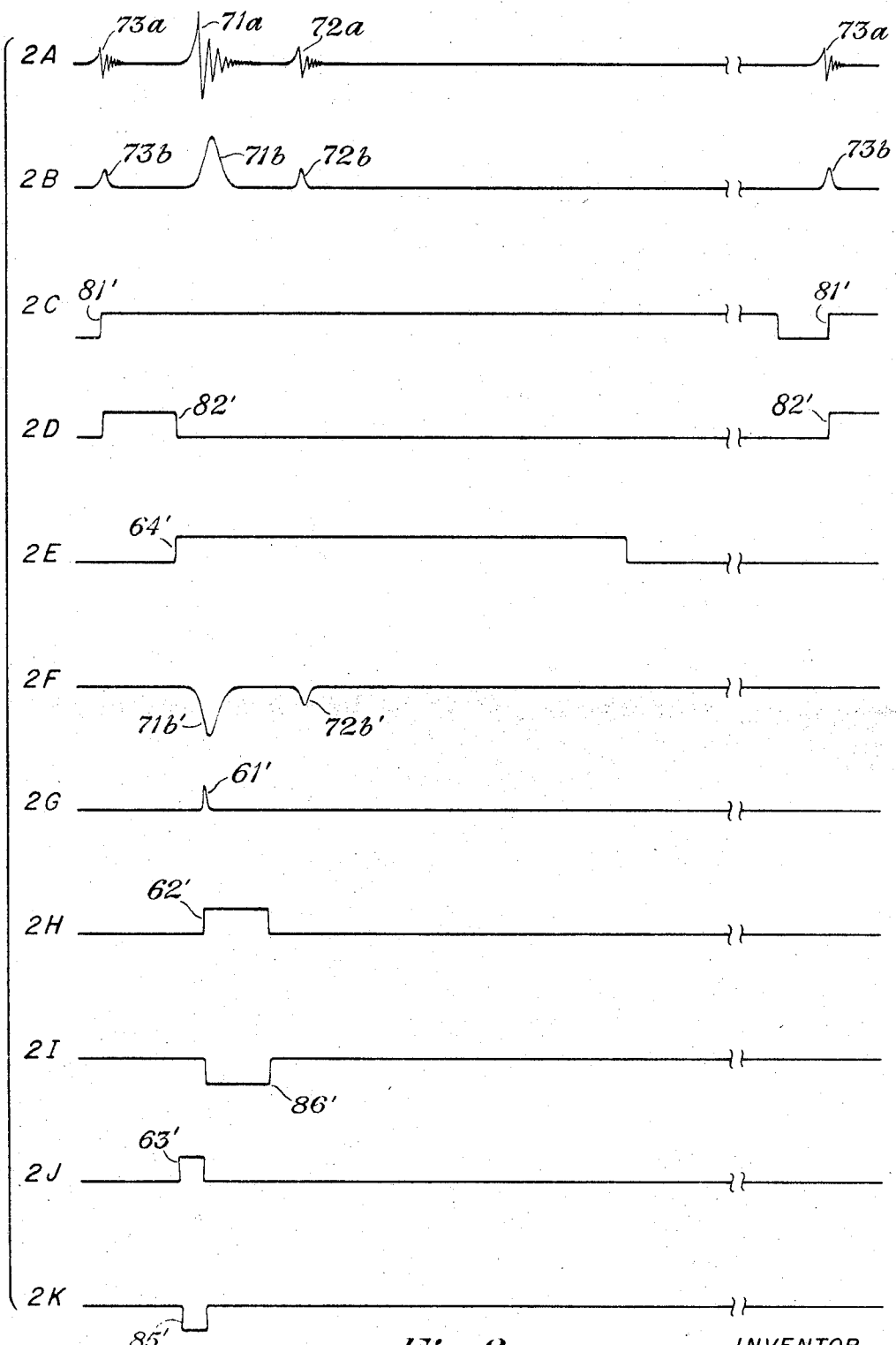
FIGS. 2A–2K illustrate traces useful in understanding the present invention.

The arrangement for producing output signals of the same width and amplitude and representative of only the primary reflection during each period of operation of the transducer 14 is illustrated in FIG. 1 in block diagram and shown located within the dashed configuration 60. This arrangement comprises a signal-tracking amplifier or control circuitry 61, a monostable multivibrator 62, and a feedback monostable multivibrator 63 employed in combination with gating multivibrator 64 and a signal gate 65. The output of the transducer 14, representative of reflected acoustic energy, is detected and is applied to gate 65 by way of amplifier 66 which also acts as an inverter. This output is illustrated in the traces shown in FIGS. 2A and 2B. A primary reflection from the borehole is illustrated by signal 71a, while a subsequent signal due to reverberation is illustrated at 72a. The pulse shown at 73a represents a portion of output produced by the transducer 14 when it is actuated and which is employed as a sync pulse. The downhole circuitry illustrated in block diagram 26, in FIG. 1, detects the resulting signals to form from signals 71a, 72a, and 73a, the envelop signals 71b, 72b, and 73b, respectively, for transmission to the surface.

Referring again to FIG. 1, the gate 65 insures that the electron beam is turned ON or modulated only by the signals representative of reflected energy. Normally, this gate is OFF and is opened only at a time when the reflected signals are expected to occur to allow their passage. Sync pulses 73b are employed to open the gate 65 at the desired time. These sync pulses, amplified by amplifier 80, trigger sync monostable multivibrator 81 for the production of output pulses illustrated at 81' in FIG. 2C.

A delay multivibrator 82, whose output is illustrated at 82' in FIG. 2D, is triggered coincidentally by the output from multivibrator 81. The output of multivibrator 82 is differentiated and a spike obtained from the trailing edge of signal 82' is employed to trigger monostable multivibrator 64 for the production of a gating signal. This gating signal is illustrated at 64' in FIG. 2E and occurs when the signals representative of reflected energy are expected to occur. Signal 64' opens the gate 65 to allow the reflected signals, inverted by amplifier 66 as illustrated at 71b' and 72b' in FIG. 2F, to pass to potentiometer 83. Potentiometer arm 84 is adjusted to control the level of signals passed to signal-tracking amplifier 61. This amplifier normally produces a zero level output and requires two inputs of low level or negative polarity applied thereto simultaneously before it will produce a positive output. The inputs to amplifier 61 are applied from arm 84 and from inverter 85 coupled from multivibrator 63. The positive output produced by amplifier 61 with the arrangement shown is a pulse, illsutrated at 61' in FIG. 2G, of short duration and having a fast rise and fall time. The beginning of this pulse substantially coincides with the beginning of a primary reflection 71a and is employed to trigger monostable multivibrator 62 for the production of a square-wave signal 62' which begins at a time substantially coinciding with the beginning of pulse 61'. Each square-wave signal 62' produced by multivibrator 61 has the same width and amplitude. Each signal 62' is inverted by circuitry 86 for the production of a negative signal illustrated at 86' in FIG. 2I. Each signal 86' also has the same width and amplitude and is applied to the Z axis of scope 52 to turn the electron beam ON as indicated above.

Only one signal 62' and hence only one signal 86' is produced during each period of operation of the transducer, however, since signal 62' is applied to feedback multivibrator 63 to terminate the positive output from amplifier 61 shortly after its beginning, thereby causing the fast fall time of signal 61'.

Referring to FIG. 2J, the output of multivibrator 63 normally is at a low or zero level. The output of gating multivibrator 64 is applied to trigger multivibrator 63 for the production of a square-wave signal 63' which begins at a time coinciding with the beginning of the output pulse 64' produced by gating multivibrator 64. This signal 63' is inverted by inverter 85 for the production of a negative signal 85' illustrated in FIG. 2K. Signal 85' is applied to one of the two inputs of amplifier 61, allowing the passage of negative polarity signal pulses applied to the other input. The square-wave signal 62' is fed back to multivibrator 63. The beginning of the square-wave signal 62' terminates signal 63' and hence signal 85', thereby blocking the passage of pulses through amplifier 61 immediately following the beginning of a primary signal 72b. Amplifier 61 cannot pass any more signals from gate 65 during this same period since gating multivibrator 64 will not be triggered until the next period. With this arrangement, it can be seen that each signal 62' and hence each signal 86' applied to intensity modulate the scope 52 will have the same width and amplitude. Potentiometer 83 is employed to determine the amplitude of received signals which turns the electron beam ON. Moreover, feedback multivibrator 63 will allow only one signal 62' to be produced during each cycle of operation, thereby blocking secondary signals 72b, due to reverberations, and which occur subsequent to the primary signal 71b.

In actual logging operations wherein a cased hole is to be inspected, the potentiometer arm 84 initially is located at a position where one may obtain a picture which shows surface irregulartities since these are of interest as well as apertures in the casing. After the irregularities are located and apertures are not evident, a subsequent run is made with the arm 84 readjusted to determine whether the casing had any apertures hidden within the data obtained across the areas where the irregularities were reflected.

Figure 3:
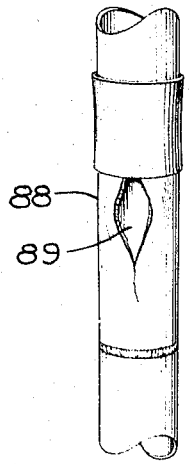
FIG. 3 illustrates a damaged pipe examined with the system of the present invention.
Figure 4:
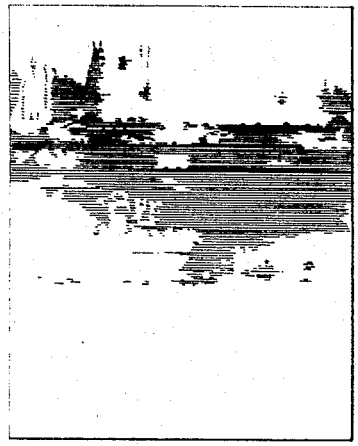
FIGS. 4 and 5 illustrate pictures of the interior of the pipe of FIG. 3 obtained with the system of the present invention.
Figure 5:
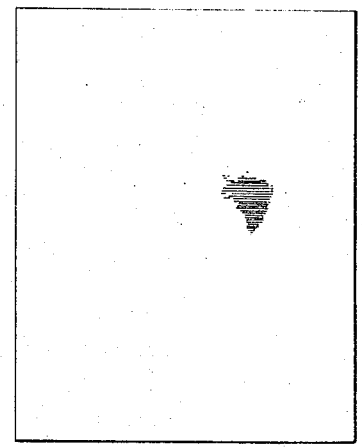

The pictures of FIGS. 4 and 5 were obtained in this manner to investigate the pipe 88, shown in FIG. 3, which had a hole 89 formed therethrough. The tool 13 was inserted in the pipe with the potentiometer arm 84 adjusted for example, by placing it at the midpoint of the resistor of potentiometer 83 to obtain a relatively high threshold. With a high threshold, the amplitude of the pulses applied to amplifier 61 by way of arm 84 was such that only strong signals as a result of acoustic energy reflecting from smooth portions of the pipe were able to cause amplifier 61 to produce an output. Thus, the weaker signals, due to corrosion or deformation of the pipe, as well as the lack of a signal, due to the aperture, were unable to cause the electron beam to be turned ON. The picture illustrated in FIG. 4 resulted. The picture obtained had tones of black and white only although the black portions are illustrated in line form. These black portions are due to the aperture 89 in the pipe and also corrosion pits formed on the interior surface and/or deformation of the pipe adjacent the aperture 89. The white portions of FIG. 4 represent smooth or strong reflecting surfaces of the interior of the pipe 88 where strong reflected pulses were detected by the transducer 14 and the electron beam was turned ON.

In the second run through the pipe 88, the potentiometer arm 84, was adjusted to a higher position whereby a lower threshold was obtained to allow the weaker signals as well as stronger signals to actuate the amplifier 61 to turn the electron beam ON. With the lower threshold, only the lack of a signal obtained opposite the aperture 89 resulted in the electron beam remaining OFF whereby the image of the aperture 89 is clearly shown in FIG. 5. The picture obtained had tones of black and white only although the black portions are shown in line form.

Figure 6:
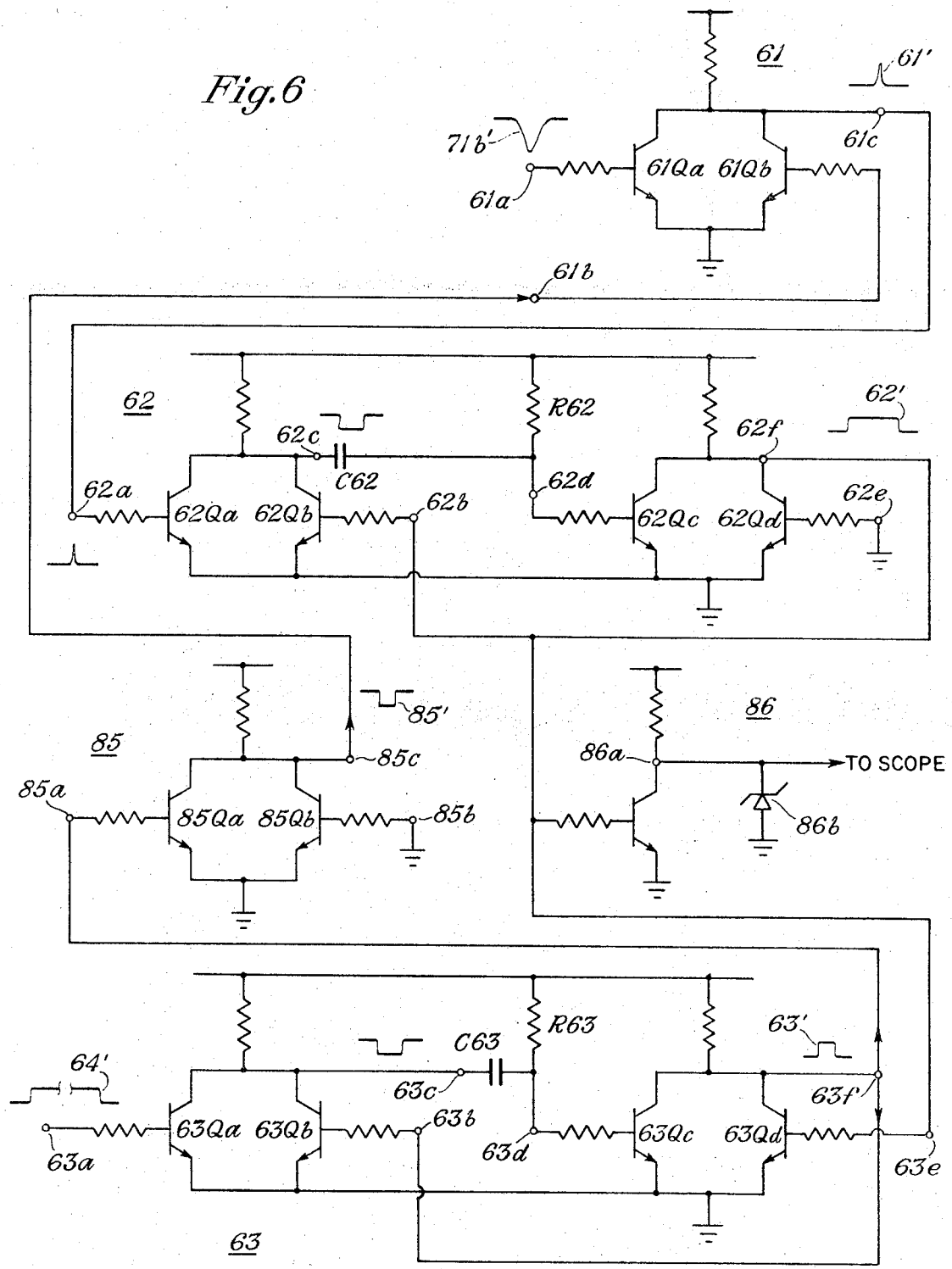
FIG. 6 illustrates in detail the circuitry of the present invention.

Referring now to FIG. 6, there will be described in detail the circuitry forming the amplifier 61, multivibrators 62 and 63, and amplifier 85. The components forming these amplifiers and multivibrators consist essentially of a number of dual input gates, each gate formed by two NPN transistors and associated resistors. These gates are available commercially from Fairchild Semiconductor, Mountain View, Calif., and are identified as $\mu$L–914. The gates are formed in modules or packages, each module having two pairs of gates. The modules have a number of connecting terminals for coupling purposes to obtain the desired operation.

The gates individually may be operated as negative logic NAND gates whereby an output is produced if two negative inputs are applied thereto simultaneously. For example, transistors 61Qa and 61Qb are coupled together to form the amplifier 61 which has two input terminals 61a and 61b and one output terminal 61c. If either one of these transistors is placed in a conductive state by the application of a positive signal to input 61a or 61b, then a low-level or no signal is obtained from output 61c regardless of the input applied to the other transistor. On the other hand, if both of these transistors are placed in a nonconductive state by the application of a negative voltage of a certain level to the input 61a and input 61b, then a positive signal will be obtained from output 61c.

Normally, the signals applied to inputs 61a and 61b are at a high or positive level whereby the transistors 61Qa and 61Qb are conducting and a low-level or zero signal is obtained from output 61c. During the production of a signal from a multivibrator 63, the output from amplifier 85 is a negative and is applied to input 61b. Transistor 61Qb thus is cut OFF and transistor 61Qa has control of the output. A negative signal of a certain level that appears at its input will result in the production of a positive signal at the output 61c. Thus, when a negative signal is produced from a primary reflection and applied to input 61a coincidentally with the production of a negative signal from amplifier 85, a positive signal will be produced at 61c.

This output is applied to multivibrator 62 formed by transistor pairs 62Qa–62Qb and 62Qc–62Qd. Capacitor $C_{62}$ and resistor $R_{62}$ comprise an RC time constant coupling these pairs to obtain the monostable multibrator operation. Input 62a and output 62f and hence input 62b normally are at low level whereby output 62c is normally at a high level. A positive pulse from ouput 61c when applied to input 62a causes output 62c to decrease, which cuts off conduction in transistor 62Qc. Hence, output 62f and input 62b increase. The input at 62b thus controls transistor pair 62Qa–62Qb and keeps the output 62c down during the RC action. When the charge leaks off of the capacitor $C_{62}$ to allow transistor 62Qc to conduct, the output 62f decreases and the output 62c increase whereby a cycle is completed.

The square-wave signal 62' from output 62f is inverted by transistor 86a and applied to the scope to turn its electron beam ON. Zener diode 86b limits the output from transistor 86a to a certain constant level to maintain the inverted signals from transistor 86a within the operating range of the scope.

Signal 62' also is applied to the input 63e of transistor pair 63Qc–63Qd. This pair is coupled to transistor pair 63Qa–63b by way of RC timing capacitor $C_{63}$ and resistor $R_{63}$ to form the monostable multivibrator 63. Input 63a and output 63f and hence input 63b normally are at a low level whereby output 63c is normally at a high level. A positive pulse 64' from gating multivibrator 64 when applied to input 63a initiates the multivibrator action and causes output 63c to decrease and hence output 63f to increase. Output 63f is applied back to input 63b to control transistor pair 63Qa–63Qb and keep the output 63c down during the RC action. Ordinarily, when the charge leaks off of capacitor $C_{63}$ to allow transistor 63Qc to conduct, output 63f decreases and output 63c increases.

Normally, input 63e is low and control of its associated transistor pair is through transistor 63Qc. Thus, when the multivibrator 63 is triggered, the input at 63d decreases and transistor 63Qc is turned OFF. A positive input pulse 62' at 63e however will cause transistor 63Qd to conduct. This causes the output at 63f to drop and hence prematurely terminate the RC action. The positive pulse 63' produced at output 63f thus terminates at a time coinciding with the beginning of the positive pulse 62' as indicated above. This positive pulse 63' is applied to transistor pair 85Qa–85Qb whose inputs 85a and 85b normally are at a low level whereby the output at 85c is normally at a high level. The positive input to terminal 85a causes transistor 85Qa to conduct, thereby producing a negative output at terminal 85c which is applied to input 61b of amplifier 61.

In one embodiment, the transducer mount 18 had a diameter of three inches and was employed in a tool 13 used to log a five-inch diameter hole. Under these conditions, the first arrival following the production of an acoustic pulse is the primary reflection 71a. It arrives in about 34 microseconds which is the two-way travel time between the transducer and the borehole wall. The gating signal 64' begins at about 25 microseconds following the acoustic pulse generated and has a time period of about 150 microseconds. Since the first arrival is the primary reflection, this gating signal can be employed to eliminate any effects due to crossfeed and other spurious signals. This gating signal, in the embodiment for cased hole logging, preferably is made wide enough to accept wide variations in travel time of the primary reflection 71a which will result, for example, in collapsed casing or in casing sections which are offset, due to improper insertion, and wherein the tool becomes decentralized.

Since the reverberations 72a are received in about 34 microseconds following reception of the primary reflection 71a, the wide gating signal 64' desired will not be able to block the reverberations 72a. This function is performed by the feedback arrangement of the present invention described above.

In one embodiment, the envelope signals 71b produced had a duration of the order of 5 to 10 microseconds and the control signal 61' had a duration of the order of 1 microsecond. Signals 85' had an amplitude of 6 volts negative and a width of 20 microseconds. The scope 52 was of the type manufactured by Tektronix Inc., Portland, Ore., Model No. 561A.

Although the feedback arrangement described above was disclosed in connection with a tool and system used to log cased holes, it is understood that a modification of the feedback arrangement could be employed in open hole logging to prevent reverberations from turning the electron beam ON. In such a system, when employed for open hole purposes, the full width and amplitude of the primary signal would be allowed to pass through the signal gate and to the scope to turn the electron beam ON in order to obtain as much fracture and lithological information as possible. The primary signal passed through the gate, however, is fed back to close the gate to prevent subsequent reverberations from turning the electron beam ON. Such a system is shown in FIG. 7. The corresponding waveforms are shown in FIG. 8. Some of the components and waveforms of FIGS. 7 and 8 are the same as disclosed in FIGS. 1 and 2. Hence, like components and waveforms will be identified by like reference characters.

Referring to FIGS. 7 and 8, the downhole detected signals obtained from the transducer 14 are transmitted to the surface, then applied to amplifier 66 where they are inverted, and then applied to signal gate 65. The sync pulses trigger sync multivibrator 81 for the production of a sync signal 81' which in turn triggers delay multivibrator 82 for the production of a delay pulse 82'. The output of delay multivibrator 82 triggers monostable multivibrator 90, which is similar to multivibrator 63, for the production of a gating signal 90' which occurs when the primary reflection signal 71b is expected to occur. The output of multivibrator 90 then opens the gate 65. The primary signal 71b is inverted by gate 65 and passed to inverter 91 whose output is applied to the scope. The output from gate 65 also is fed back to close this gate after the primary signal 71b has passed and prior to the arrival of a reverberation signal 72b. Feedback is by way of monostable multivibrator 92 which is triggered by the signal 71b and produces a delay pulse 92'. This pulse begins shortly after the arrival of signal 71b and may have a width of about 20 microseconds. Pulse 92' triggers monostable multivibrator 93 for the production of a pulse 93' which is applied to terminate the RC action of multivibrator 90 in a manner similar to that described with respect to multivibrator 63. Termination of the output pulse 90' of multivibrator 90 occurs after signal 71b has passed gate 65 and prior to the arrival of a reverberation signal 72b whereby gate 65 is closed when the signal 72b arrives and for the remainder of the period.

Figure 9:
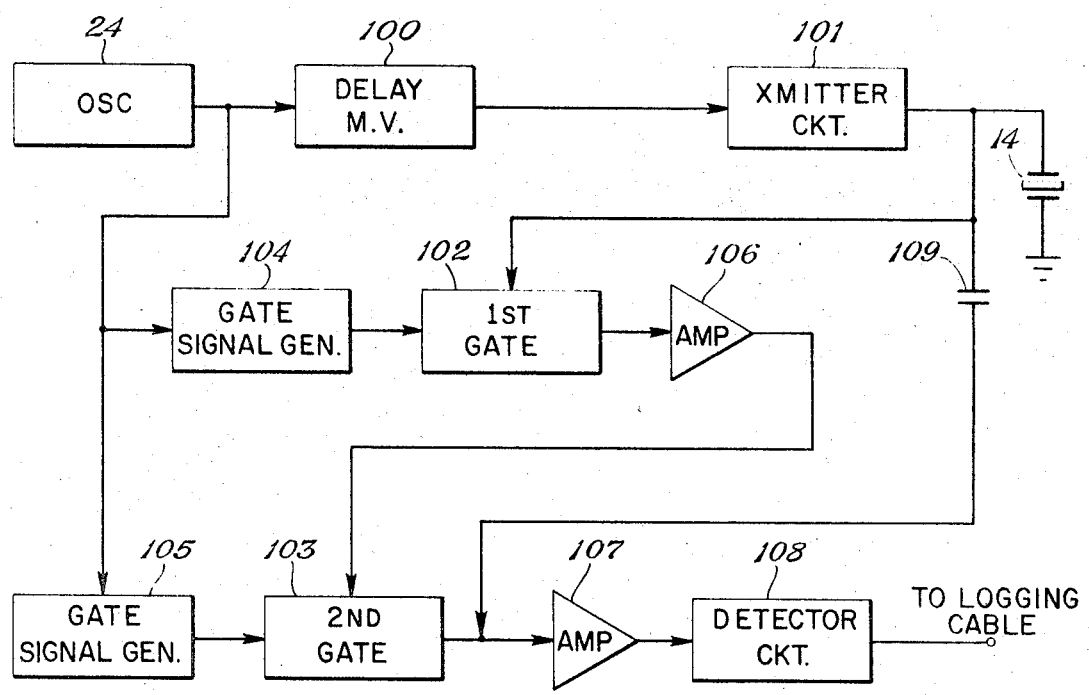
FIG. 9 illustrates in block diagram the downhole system for obtaining the signals which are transmitted uphole for processing in accordance with the present invention.

Referring to FIG. 9, the downhole system is shown in more detail. The output of oscillator 24 is delayed slightly at circuit 100 to trigger a transmitter circuit 101 to excite the transducer 14. The transmitter pulse crossfeed is minimized by the use of a dual gating system including the normally open gates 102 and 103. This system is described and claimed in copending application Ser. No. 718,511 filed Apr. 3, 1968, by Arvindhai S. Patel and assigned to the same assignee as the present invention. During the time the transmitter is fired, gate 102 is closed by a gating signal from circuit 104 while gate 103 is closed by a gating signal from circuit 105. Both of these circuits are triggered slightly before the transmitter is fired to insure that the gates 102 and 103 are closed before the transmitter is fired. The first gate 102 thus passes the reflected signal detected by the transducer 14 but blocks or attenuates the transmitter crossfeed. The output of the first gate is amplified at 106 to a high level and then fed to the second gate 103 which again passes the reflected signal but attenuates the transmitter crossfeed to a very low level compared with the amplitude of the reflected signal. The output of the second gate is amplified at 107 and applied to a detector circuit 108 to form the envelope signals as mentioned above.

In order to obtain a sync pulse, the signal produced by transducer 14, when it fires, is attenuated to a lower level by the combination of capacitor 109 and the input impedance of amplifier 107 and then applied to detector 108 where its envelope is formed.

Referring again to FIG. 1, there will be described briefly the system employed for vertically stepping the trace 54 produced upon each rotation of the transducer 14. This system comprises a potentiometer 110, the arm of which is mechanically coupled through gear reducer 111 to reel 112 driven by the logging cable 43. As the cable 43 is moved continuously to move the tool 13 through the borehole, the contact of the potentiometer 110 moves across the resistance element, thereby generating a slowly changing sweep voltage which is applied to the vertical deflection plate of the oscilloscope 52. The inclined trace indicates the continuous change in depth of the logging tool. Each trace will begin at a height substantially where the preceding trace terminated.

Now that the invention has been described, modifications will become apparent to those skilled in the art and it is intended to cover such modifications as fall within the scope of the appended claims.

What is claimed is:

1. In a system including:
    an elongated borehole tool for insertion into a borehole and having acoustic transmitting and receiving means adapted to be rotated about the longitudinal axis of said tool and hence the axis of said borehole,
    said acoustic transmitting and receiving means being operable to produce acoustic pulses periodically for exploratory purposes and to detect reflected acoustic pulses,
    a display device including deflection means to control the movement of an electron beam across a display medium, and
    modulating means for controlling the intensity of said electron beam,
    the combination therewith of:
        signal-producing means for producing signals representative of reflected acoustic pulses detected, and
        signal-shaping means responsive to selective signals from said signal-producing means for producing output signals each having the same width and the same amplitude for use in controlling said modulating means.

2. The combination of claim 1 comprising:
    means for blocking the passage of signals from said signal-producing means to said signal-shaping means following the passage of the first signal to said signal-shaping means during each period of operation of said transmitting and receiving means whereby only one output signal is produced during each period.

3. The combination of claim 1 comprising:
    control circuitry coupled between said signal-producing means and said signal-shaping means for passing signals from said signal-producing means to said signal-shaping means, and
    feedback means for feeding back said output signals for rendering said control circuitry nonresponsive to signals from said signal-producing means following the passage of the first signal by said control circuitry during each period of operation of said transmitting and receiving means whereby only one output signal is produced during each period.

4. In a system for obtaining data within a cased borehole having fluid therein and a reflecting interface between said fluid and the casing confining said fluid in said borehole, said system including:
    an elongated borehole tool for insertion into a borehole and having acoustic transmitting and receiving means adapted to be rotated about the longitudinal axis of said tool and hence the axis of said borehole,
    said acoustic transmitting and receiving means being operable to produce bursts of acoustic energy periodically for exploratory purposes and to detect acoustic energy reflected from said interface,
    said reflected acoustic energy of interest detected during each period of operation being the primary reflection of acoustic energy from said interface and which has been reflected only once,
    a display device including deflection means to control the movement of an electron beam across a display medium, and
    modulating means for intensity modulating said electron beam,
    the combination therewith of:
        signal-producing means for producing signals representative of reflected acoustic pulses detected,
        gating signal-generating means for generating a gating signal beginning at a period of time when signals representative of primary reflections are expected to occur,
        control circuitry for producing an output in response to signals applied thereto,
        gate means coupled to said signal-producing means and to said gating signal-generating means for passing signals from said signal-producing means,
        adjustable means for allowing signals of high and low amplitude to pass from said gate means to said control circuitry,
        signal-shaping means coupled to the output of said control circuitry for producing output signals of the same width and amplitude in response to signals passed by said control circuitry, and
        feedback means responsive to the output of said gating signal-generating means for generating a control signal beginning at a time coinciding with the generation of a gating signal,
        said output signals being employed to control said modulating means to turn said electron beam ON at a repetition rate dependent upon the occurrence of said output signals,
        said output signals being applied to said feedback means for terminating the production of said control signal at a time shortly after the beginning of an output signal during each period,
        said control signal being applied to said control circuitry for rendering said control circuitry operative for the passage of signals from said gate means only during the time of production of a control signal.

5. In a system for obtaining data within a borehole having fluid therein and a reflecting interface between said fluid and the material confining said fluid in said borehole, said system including:
    an elongated borehole tool for insertion into a borehole and having acoustic transmitting and receiving means adapted to be rotated about the longitudinal axis of said tool and hence the axis of said borehole,
    said acoustic transmitting and receiving means being operable to produce bursts of acoustic energy periodically for exploratory purposes and to detect acoustic energy reflected from said interface,
    said reflected acoustic energy of interest detected during each period of operation being the primary reflection of acoustic energy from said interface and which has been reflected only once,
    a display including deflection means to control the movement of an electron beam across a display medium, and
    modulating means for controlling the intensity of said electron beam,
    the combination therewith of:
        means for producing signals representative of reflected acoustic energy detected,
        gate means for passing signals during each period of operation when the signal representative of the primary reflection is expected to occur, circuitry extending from said gate means for passing primary reflection signals to said modulating means and representative of the primary reflection of acoustic energy, and feedback means coupled to said circuitry for feeding back the primary reflection signal passed to said modulating means during each period for producing a control signal for blocking the passage to said modulating means of reverberation signals occurring during each period subsequent to the occurrence of the primary reflection signal.

6. The combination of claim 5 wherein said circuitry comprises:

signal-shaping means for producing output signals each having the same width and amplitude, and control circuitry coupled between said gate means and said signal-shaping means for passing signals from said gate means to said signal-shaping means, said feedback means being coupled to the output of said signal-shaping means and to said control circuitry for feeding back said output signals for rendering said control circuitry nonresponsive to signals passed by said gate means following the passage of the first signal through said control circuitry during each period of operation.

7. The combination of claim 5 comprising:

gating signal-generating means for opening said gate means during each period to pass the primary reflection signal, said feedback means being coupled from the output of said gate means for deriving from the primary reflection signal passed by said gate means during each period, a control signal for use in controlling said gating signal-generating means for closing said gate means following the passage therethrough of the primary reflection signal to block the passage of said reverberation signals.

8. In a system for obtaining data within a borehole having fluid therein and a reflecting interface between said fluid and the material confining said fluid in said borehole, said system including:

an acoustic transmitting and receiving means for periodically producing a burst of acoustic energy for application to said interface and for detecting acoustic energy reflected from said interface, said reflected acoustic energy of interest detected during each period of operation being the primary reflection of acoustic energy from said interface and which has been reflected only once, and a recording means, the combination therewith of:

means for producing reflection signals representative of reflected acoustic energy detected, means responsive to selective reflection signals for producing output signals of the same amplitude and width for application to said recording means, and feedback means responsive to the first output signal produced during each period of operation of said transmitting and receiving means for producing a control signal, which terminates at at a time shortly after the beginning of the reflection signal representative of the primary reflection of acoustic energy, for preventing the production of subsequent output signals during each period.

9. In a system including:

an elongated borehole tool for insertion into a borehole and having acoustic transmitting and receiving means adapted to be rotated about the longitudinal axis of said tool and hence the axis of said borehole, said acoustic transmitting and receiving means being operable to produce acoustic pulses periodically for exploratory purposes and to detect reflected acoustic pulses, a display device including deflection means to control the movement of an electron beam across a display medium, and modulating means for controlling the intensity of said electron beam, the combination therewith of:

signal-producing means for producing signals representative of reflected acoustic pulses detected, output signal-producing means responsive to selective signals from said signal-producing means for producing output signals each having at least the same width for use in controlling said modulating means, and means for blocking the passage of signals from said signal-producing means to said output signal-producing means following the passage of the first signal to said output signal-producing means during each period of operation of said transmitting and receiving means whereby only one output signal is produced during each period.

10. In a system for obtaining data within a borehole having fluid therein and a reflecting interface between said fluid and the material confining said fluid in said borehole, said system including:

an elongated borehole tool for insertion into a borehole and having acoustic transmitting and receiving means adapted to be rotated about the longitudinal axis of said tool and hence the axis of said borehole, said acoustic transmitting and receiving means being operable to produce bursts of acoustic energy periodically for exploratory purposes and to detect acoustic energy reflected from said interface, said reflected acoustic energy of interest detected during each period of operation of said transmitting and receiving means being the primary reflection of acoustic energy from said interface and which has been reflected only once, a display device including deflection means to control the movement of an electron beam across a display medium, and modulating means for controlling the intensity of said electron beam, the combination therewith of:

means for producing signals representative of reflected acoustic energy detected, and circuitry for producing output signals for use in controlling said modulating means, said circuitry being responsive only to the signal occurring each period of operation of said transmitting and receiving means and representative of the primary reflection of acoustic energy for producing only one output signal during each period, each output signal produced during successive periods having the same width and amplitude.

11. In a system for obtaining data within a borehole having fluid therein and a reflecting interface between said fluid and the material confining said fluid in said borehole, said system including:

an elongated borehole tool for insertion into a borehole and having acoustic transmitting and receiving means adapted to be rotated about the longitudinal axis of said tool and hence the axis of said borehole, said acoustic transmitting and receiving means being operable to produce bursts of acoustic energy periodically for exploratory purposes and to detect acoustic energy reflected from said interface, said reflected acoustic energy of interest detected during each period of operation of said transmitting and receiving means being the primary reflection of acoustic energy from said interface and which has been reflected only once, a display device including deflection means to control the movement of an electron beam across a display medium, and modulating means for controlling the intensity of said electron beam, the combination therewith of:
   signal-producing means for producing signals representative of acoustic energy detected,
   gate means coupled to said signal-producing means,
   gating signal-generating means for producing a gating signal for opening said gate means during each period when the signal representative of the primary reflection is expected to occur to pass the primary reflection signal,
   circuitry extending from the output of said gate means for passing the primary reflection signal to said modulating means,
   control means coupled from the output of said gate means to said gating signal-generating means and responsive to the primary reflection signal passed by said gate means for producing a control signal for terminating said gating signal to close said gate means following the passage therethrough of the primary reflection signal to block the passage of reverberation signals occurring during each period subsequent to the occurrence of the primary reflection signal.

12. A system for recording data obtained from cyclic scanning operations carried out angularly around the wall of a borehole at each of a plurality of different depths wherein:
   an energy transmitting and receiving means is rotated in said borehole and operated periodically during each cycle to transmit energy pulses toward the borehole wall and to detect reflected energy, and
   reflection signals are produced in response to reflected energy detected,
   said system comprising:
      a display device having a display medium, deflection means to control the movement of an electron beam, and modulating means for controlling the intensity of said electron beam, and
      circuitry including signal-shaping means responsive to selective ones of said reflection signals for producing output signals each having the same width and the same amplitude for use in controlling said modulating means.

13. The system of claim 12 wherein:
   said reflected energy of interest detected during each period of operation is the primary reflection of energy from said borehole wall and which has been reflected only once,
   said circuitry being responsive only to the reflection signal occurring each period of operation of said transmitting and receiving means and representative of the primary reflection of energy for producing only one output signal for each period.

14. The system of claim 12 wherein:
   said reflected energy of interest detected during each period of operation is the primary reflection of energy from said borehole wall which has been reflected only once,
   said system comprising:
      feedback means responsive to the first output signal produced during each period of operation of said transmitting and receiving means for producing a control signal which terminates at a time shortly after the beginning of the reflection signal representative of the primary reflection of energy for preventing the production of subsequent output signals during each period.

15. A system for recording data obtained from cyclic scanning operations carried out angularly around the wall of a borehole at each of a plurality of different depth wherein:
   an energy transmitting and receiving means is rotated in said borehole and operated periodically during each cycle to transmit energy pulses to the borehole wall and to detect energy reflected from said borehole wall, and
   reflection signals are produced in response to reflected energy detected,
   said system comprising:
      a display device having a display medium, deflection means to control the movement of an electron beam, and modulating means for controlling the intensity of said electron beam,
      output signal-producing means responsive to selective ones of said reflection signals for producing output signals each having at least the same width for use in controlling said modulating means, and
      means for blocking the passage of reflection signals to said output signal-producing means following the passage of the first reflection signal to said output signal-producing means during each period of operation of said transmitting and receiving means whereby only one output signal is produced during each period.

16. A system for recording data obtained from cyclic scanning operations carried out angularly around the wall of a borehole at each of a plurality of different depth wherein:
   an energy transmitting and receiving means is rotated in said borehole and operated periodically during each cycle to transmit energy pulses to the borehole wall and to detect energy reflected from said borehole wall,
   said reflected energy of interest detected during each period of operation being the primary reflection of energy from said borehole wall and which has been reflected only once, and
   reflection signals are produced in response to reflected energy detected,
   said system comprising:
      a display device having a display medium, deflection means to control the movement of an electron beam, and modulating means for controlling the intensity of said electron beam,
      gate means for passing signals during each period of operation when the signal representative of the primary reflection is expected to occur,
      circuitry extending from said gate means for passing primary reflection signals to said modulating means and representative of the primary reflection of energy, and
      feedback means coupled to said circuitry for feeding back the primary reflection signal passed to said modulating means during each period for producing a control signal for blocking the passage to said modulating means of reverberation signal occurring during each period subsequent to the occurrence of the primary reflection signal.

17. A system for recording data obtained from cyclic scanning operations carried out angularly around the wall of a borehole at each of a plurality of different depth wherein:
   an energy transmitting and receiving means is rotated in said borehole and operated periodically during each cycle to transmit energy pulses to the borehole wall and to detect energy reflected from said borehole wall,
   said reflected energy of interest detected during each period of operation of said transmitting and receiving means being the primary reflection of energy from said borehole wall and which has been reflected only once, and reflection signals are produced in response to reflected energy detected, said system comprising:

a display device having a display medium, deflection means to control the movement of an electron beam, and modulating means for controlling the intensity of said electron beam, gate means, gating signal-generating means for producing a gating signal for opening said gate means during each period when the signal representative of the primary reflection is expected to occur to pass the primary reflection signal, circuitry extending from the output of said gate means for passing the primary reflection signal to said modulating means, and control means coupled from the output of said gate means to said gating signal-generating means and responsive to the primary reflection signal passed by said gate means for producing a control signal for terminating said gating signal to close said gate means following the passage therethrough of the primary reflection signal to block the passage of reverberation signals occurring during each period subsequent to the occurrence of the primary reflection signal.

References Cited
UNITED STATES PATENTS

| | | | |
|---|---|---|---|
| 3,191,144 | 6/1965 | Pardue | 340—18 |
| 3,369,626 | 2/1968 | Zemanek | 340—18 |

RODNEY D. BENNETT, Primary Examiner

D. C. KAUFMAN, Assistant Examiner

U.S. Cl. X.R.

181—0.5; 340—18

PO-1050
(5/69)

UNITED STATES PATENT OFFICE
CERTIFICATE OF CORRECTION

Patent No. 3,553,640         Dated January 5, 1971

Inventor(s) Joseph Zemanek, Jr.

It is certified that error appears in the above-identified patent and that said Letters Patent are hereby corrected as shown below:

```
Column 3, line 46, "fliud" should be --fluid--.
Column 4, line 29, "of" should be --or--.
Column 5, line 53, "72b" should be --71b--.
Column 6, line 65, before "negative" cancel "a".
Column 7, line 5,  "ouput" should be --output--;
          line 12, "increase" should be --increases--;
          line 22, "63Qa-63b" should be --63Qa-63Qb--;
Column 10, line 13, "combniation" should be --combination--.
           line 65, after "display" insert --device--.
Column 14, line 2,  "depth" should be --depths--;
           line 30, "depth" should be --depths--;
           line 59, "signal" should be --signals--;
           line 65, "depth" should be --depths--.
```

Signed and sealed this 30th day of March 1971.

(SEAL)
Attest:

EDWARD M. FLETCHER, JR.           WILLIAM E. SCHUYLER, J.
Attesting Officer                 Commissioner of Patent